United States Patent
Guo et al.

(10) Patent No.: US 10,768,455 B2
(45) Date of Patent: Sep. 8, 2020

(54) DATA COMPENSATION METHOD AND APPARATUS FOR LIQUID CRYSTAL DISPLAY SCREEN

(71) Applicants: BOE TECHNOLOGY GROUP CO., LTD., Beijing (CN); BEIJING BOE DISPLAY TECHNOLOGY CO., LTD., Beijing (CN)

(72) Inventors: Luqiang Guo, Beijing (CN); Liugang Zhou, Beijing (CN); Shou Li, Beijing (CN); Jianming Wang, Beijing (CN); Shuhuan Yu, Beijing (CN); Chenxi Liu, Beijing (CN); Jian Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 355 days.

(21) Appl. No.: 15/743,255

(22) PCT Filed: Jul. 21, 2017

(86) PCT No.: PCT/CN2017/093844
§ 371 (c)(1),
(2) Date: Jan. 9, 2018

(87) PCT Pub. No.: WO2018/032935
PCT Pub. Date: Feb. 22, 2018

(65) Prior Publication Data
US 2020/0081278 A1 Mar. 12, 2020

(30) Foreign Application Priority Data
Aug. 19, 2016 (CN) .......................... 2016 1 0697143

(51) Int. Cl.
G02F 1/13 (2006.01)
G02F 1/13363 (2006.01)
G09G 3/36 (2006.01)

(52) U.S. Cl.
CPC ........ *G02F 1/1309* (2013.01); *G02F 1/13363* (2013.01); *G09G 3/36* (2013.01);
(Continued)

(58) Field of Classification Search
CPC combination set(s) only.
See application file for complete search history.

(56) References Cited

U.S. PATENT DOCUMENTS

| 2011/0012908 A1 | 1/2011 | Daly |
| 2011/0267383 A1* | 11/2011 | Murakami ........... G09G 3/3426 345/690 |

(Continued)

FOREIGN PATENT DOCUMENTS

| CN | 103680407 A | 3/2014 |
| CN | 103868610 A | 6/2014 |

(Continued)

OTHER PUBLICATIONS

Office Action received for Chinese Patent Application No. 201610697143.1, dated May 17, 2017, 10 pages (5 pages of English Translation and 5 pages of Office Action).

(Continued)

*Primary Examiner* — Deeprose Subedi
(74) *Attorney, Agent, or Firm* — Womble Bond Dickinson (US) LLP

(57) ABSTRACT

A data compensation method and apparatus for a liquid crystal display screen are described herein. Said method comprises determining a timing length ΔT' from the last turn-off of the liquid crystal display screen upon turn-on of the liquid crystal display screen, and determining a mura data compensation table $a_m$ called at the time of the last turn-off; determining a mura data compensation table to be called at the time of the present turn-on according to a pre-set time length T needed for stabilization of mura, mura data compensation tables corresponding to pre-set different time periods, said timing length ΔT', and said mura data compensation table $a_m$; performing data compensation start- (Continued)

ing from the determined mura data compensation table to be called at the time of the present turn-on. By using said method for data compensation, an appropriate initial data compensation table can be determined to obtain a better compensation effect.

12 Claims, 1 Drawing Sheet

(52) U.S. Cl.
CPC ............. *G09G 2320/0285* (2013.01); *G09G 2320/041* (2013.01)

(56) References Cited

U.S. PATENT DOCUMENTS

| | | | |
|---|---|---|---|
| 2012/0075354 A1* | 3/2012 | Su | G09G 5/10 345/690 |
| 2016/0071487 A1 | 3/2016 | Lu et al. | |
| 2017/0213493 A1* | 7/2017 | Han | G09G 3/3208 |
| 2017/0243562 A1 | 8/2017 | Hu et al. | |
| 2019/0340995 A1* | 11/2019 | Miyata | G09G 3/3688 |

FOREIGN PATENT DOCUMENTS

| | | |
|---|---|---|
| CN | 104299563 A | 1/2015 |
| CN | 104992657 A | 10/2015 |
| CN | 105206217 A | 12/2015 |
| CN | 105590606 A | 5/2016 |
| CN | 106297691 A | 1/2017 |

OTHER PUBLICATIONS

International Search Report received for PCT Patent Application No. PCT/CN2017/093844, dated Sep. 29, 2017, 6 pages (2 pages of English Translation and 4 pages of Original Document).

Chinese Search Report received for CN Patent Application No. 201610697143.1, dated Feb. 16, 2017, 9 pages (3 pages of English Translation and 6 pages of Office Action).

* cited by examiner

DATA COMPENSATION METHOD AND APPARATUS FOR LIQUID CRYSTAL DISPLAY SCREEN

RELATED APPLICATION

The present application is the U.S. national phase entry of PCT/CN2017/093844, with an international filing date of Jul. 21, 2017, which claims the benefit of Chinese Patent Application No. 201610697143.1, filed on Aug. 19, 2016, the entire disclosures of which are incorporated herein by reference.

TECHNICAL FIELD

The present disclosure relates to the technical field of display, in particular to a data compensation method and apparatus for a liquid crystal display screen.

BACKGROUND

Presently, a period of time is needed for a liquid crystal display screen to reach a stable temperature from its ignition so as to enter into a stable display state, and in said period of time, as the temperature gradually rises to become stable, mura in the liquid crystal display screen undergoes a process from being serious to light and finally stable. With respect to the problem of mura, in the prior art, a mura data compensation table is usually called for compensation after turning on of the liquid crystal display screen. When the liquid crystal display screen is turned off, the temperature gradually drops and the mura of the liquid crystal display screen itself will also slowly recover to the initial state from a light state. If the liquid crystal display screen is turned on again before the mura has recovered to the initial state, the mura data compensation table called will be inconsistent with the actually needed compensation, thus resulting in a poor compensation effect.

SUMMARY

According to one aspect of the present disclosure, a data compensation method for a liquid crystal display screen is provided, which comprises:

determining a timing length $\Delta T'$ from the last turn-off of the liquid crystal display screen upon turn-on of the liquid crystal display screen, and determining a mura data compensation table $a_m$ called at the time of the last turn-off;

determining a mura data compensation table to be called at the time of the present turn-on according to a pre-set time length T needed for stabilization of mura, mura data compensation tables corresponding to pre-set different time periods, said determined timing length $\Delta T'$, and said mura data compensation table $a_m$;

performing data compensation starting from the determined mura data compensation table to be called at the time of the present turn-on.

Optionally, said determining a timing length $\Delta T'$ from the last turn-off comprises:

determining a time from the last turn-off to the present turn-on as the timing length $\Delta T'$ from the last turn-off.

Optionally, in response to the timing length $\Delta T'$ reaching the pre-set time length T needed for stabilization of mura, timing is stopped.

Optionally, said determining a mura data compensation table to be called at the time of the present turn-on comprises:

determining whether the timing length $\Delta T'$ is smaller than the time length T needed for stabilization of mura;

if the timing length $\Delta T'$ is smaller than the time length T needed for stabilization of mura, determining a mura data compensation table to be called at the time of the present turn-on according to the time length T needed for stabilization of mura, the mura data compensation tables corresponding to pre-set different time periods, the timing length $\Delta T'$, and the mura data compensation table $a_m$; wherein the pre-set different time periods correspond to different mura data compensation tables, and said T includes N time periods with a length $\Delta T$, wherein the $(n+1)^{th}$ time period $[n*\Delta T, (n+1)*\Delta T]$ corresponds to a mura data compensation table $a_n$, n is an integer within the range of [0, N−1]; and time periods after said T correspond to mura data compensation table $a_N$;

if the timing length $\Delta T'$ is greater than or equal to the time length T needed for stabilization of mura, determining a mura data compensation table to be called at the time of the present turn-on to be the mura data compensation table corresponding to the first time period in said T.

Optionally, said if the timing length $\Delta T'$ is smaller than the time length T needed for stabilization of mura, determining a mura data compensation table to be called at the time of the present turn-on according to said time length T needed for stabilization of mura, the mura data compensation tables corresponding to pre-set different time periods, said timing length $\Delta T'$, and said mura data compensation table $a_m$ comprises:

determining if a difference between m and $\Delta T'/\Delta T$ is greater than zero; if yes, determining that the mura data compensation table called at the time of the present turn-on is $a_n$ according to the equation $n=[m-\Delta T'/\Delta T]$; otherwise, determining that the mura data compensation table to be called at the time of the present turn-on is the mura data compensation table corresponding to the first time period in said T.

Optionally, the mura data compensation tables corresponding to different time periods are pre-set by the following steps:

starting from the start-up time, erasing mura using a mura erasing device to obtain a mura data compensation table $a_0$, then erasing the mura once every $\Delta T$ until the mura is stable, thereby obtaining and storing mura data compensation tables $a_1 \sim a_N$.

According to a second aspect of the present disclosure, a data compensation apparatus for a liquid crystal display screen is provided, which comprises:

a timing and compensation data table determining component configured to determine a timing length $\Delta T'$ from the last turn-off of the liquid crystal display screen upon turn-on of the liquid crystal display screen; determine a mura data compensation table $a_m$ called at the time of the last turn-off; determine a mura data compensation table to be called at the time of the present turn-on according to a pre-set time length T needed for stabilization of mura, mura data compensation tables corresponding to pre-set different time periods, said determined timing length $\Delta T'$, and said mura data compensation table $a_m$;

a data compensation component configured to perform data compensation starting from the determined mura data compensation table to be called at the time of the present turn-on.

Optionally, said timing and compensation data table determining component is configured to determine a time from the last turn-off to the present turn-on as the timing length ΔT' from the last turn-off when determining the timing length ΔT' from the last turn-off.

Optionally, said timing and compensation data table determining component is configured to stop the timing in response to the timing length ΔT' reaching the time length T needed for stabilization of mura.

Optionally, said timing and compensation data table determining component is configured, when determining the mura data compensation table to be called at the time of the present turn-on, to:

determine whether the timing length ΔT' is smaller than the time length T needed for stabilization of mura;

determine a mura data compensation table to be called at the time of the present turn-on according to the time length T needed for stabilization of mura, the mura data compensation tables corresponding to pre-set different time periods, the timing length ΔT', and the mura data compensation table $a_m$ if the timing length ΔT' is smaller than the time length T needed for stabilization of mura; wherein the pre-set different time periods correspond to different mura data compensation tables, and said T includes N time periods with a length ΔT, wherein the $(n+1)^{th}$ time period [n*ΔT, (n+1)*ΔT] corresponds to a mura data compensation table $a_n$, n is an integer within the range of [0, N−1]; and time periods after said T correspond to mura data compensation table $a_N$;

determine a mura data compensation table to be called at the time of the present turn-on to be the mura data compensation table corresponding to the first time period in said T, if the timing length ΔT' is greater than or equal to the time length T needed for stabilization of mura.

Optionally, under the condition of determining a mura data compensation table to be called at the time of the present turn-on according to the time length T needed for stabilization of mura, the mura data compensation tables corresponding to pre-set different time periods, the timing length ΔT', and the mura data compensation table $a_m$ if the timing length ΔT' is smaller than the time length T needed for stabilization of mura, said timing and compensation data table determining component is configured to:

determine if a difference between m and ΔT'/ΔT is greater than zero; if yes, determine that the mura data compensation table initially called at the time of the present turn-on is $a_n$ according to the equation n=[m−ΔT'/ΔT]; otherwise, determine that the mura data compensation table to be called at the time of the present turn-on is the mura data compensation table corresponding to the first time period in said T.

Optionally, said data compensation apparatus further comprises a configuring component which is configured to pre-configure the mura data compensation tables corresponding to different time periods in such a way as:

starting from the start-up time, erasing mura using a mura erasing device to obtain a mura data compensation table $a_0$, then erasing the mura once every ΔT until the mura is stable, thereby obtaining and storing mura data compensation tables $a_1 \sim a_N$.

DETAILED DESCRIPTION

The data compensation method and apparatus for a liquid crystal display screen provided in the present disclosure will be described in further detail below in conjunction with the drawings and the embodiments.

Figure 1:
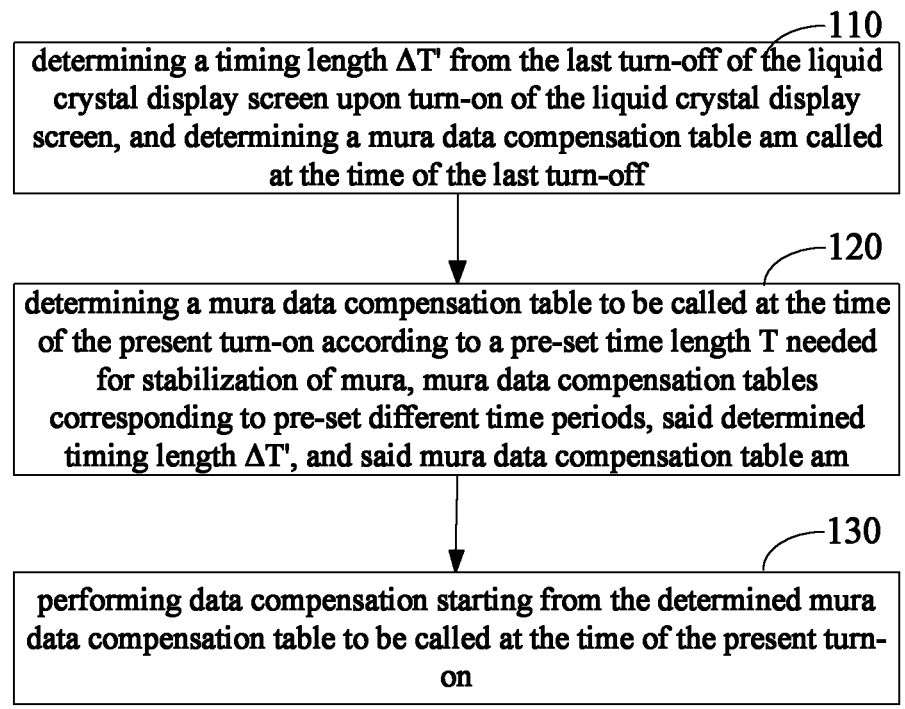
FIG. 1 is a flow chart of a data compensation method for a liquid crystal display screen according to an embodiment of the present disclosure.

As shown in FIG. 1, an embodiment of the present disclosure provides a data compensation method for a liquid crystal display screen, which comprises:

step 110: determining a timing length ΔT' from the last turn-off of the liquid crystal display screen upon turn-on of the liquid crystal display screen, and determining a mura data compensation table $a_m$ called at the time of the last turn-off;

step 120: determining a mura data compensation table to be called at the time of the present turn-on according to a pre-set time length T needed for stabilization of mura, mura data compensation tables corresponding to pre-set different time periods, said determined timing length ΔT', and said mura data compensation table $a_m$;

wherein, the pre-set time length T needed for stabilization of mura refers to the time length needed for the process in which the mura gradually becomes less serious from being most serious (i.e. initial state) until being stable, and the specific value of T can be set as an empirical value;

step 130: performing data compensation starting from the determined mura data compensation table to be called at the time of the present turn-on.

In the embodiment of the present disclosure, owing to the different temperatures, the mura is exhibited in different degrees in different time periods. In the present solution, different mura data compensation tables are configured for different time periods, and after turn-on of the liquid crystal display screen, an appropriate initial data compensation data is determined according to the time needed for stabilization of the mura, the timing from the last turn-off of the liquid crystal display screen, and the data compensation table called at the time of turn-off, so the compensation effect is better.

In the embodiment, determining the timing length ΔT' from the last turn-off may comprise: determining a time from the last turn-off to the present turn-on as the timing length ΔT' from the last turn-off. Such an implementation is simple and convenient. However, in this implementation, there may be a situation that the liquid crystal display screen is turned on after being turned off for a long time, then if the timing continues in this period of time, a lot of electrical energy will be consumed, and when the time elapsed after the turn-off reached T, the mura of the liquid crystal display screen will certainly be restored to the initial state and timing is no longer necessary. Therefore, further, in response to the timing length ΔT' reaching the pre-set time length T needed for stabilization of mura, timing is stopped.

In the embodiment, said step 120 can be implemented in different ways. One way of determining the mura data compensation table to be called at the time of the present turn-on may be: determining whether ΔT' is smaller than T; if ΔT' is smaller than T, determining the mura data compensation table to be called at the time of the present turn-on according to said T, the mura data compensation tables corresponding to pre-set different time periods, said ΔT', and said mura data compensation table $a_m$; the pre-set different time periods correspond to different mura data compensation tables, wherein said T includes N time periods with a length ΔT, and wherein the $(n+1)^{th}$ time period [n*ΔT, (n+1)*ΔT] corresponds to a mura data compensation table $a_n$, n is an integer within the range of [0, N−1]; and time periods after said T correspond to mura data compensation table $a_N$; if ΔT' is greater than or equal to T, determining the mura data compensation table to be called at the time of the present turn-on to be the mura data compensation table corresponding to the first time period in said T.

In this embodiment, if ΔT' is smaller than T, when turning on the liquid crystal display screen after ΔT' has elapsed since the turn-off, the mura might have restored to the initial state already or not. Thus the mura data compensation table to be called may be any mura data compensation table in different time periods. If ΔT' is greater than or equal to T, when turning on the liquid crystal display screen after ΔT' has elapsed since the turn-off, the mura must have restored to the initial state already. In the N time periods with a length ΔT included in T, the first time period corresponds to the initial state of the mura, so what is to be called at this time must be the mura data compensation table corresponding to the first time period in T.

The number N of the time periods with a length ΔT included in T can be set as desired.

In the embodiment, if ΔT' is smaller than T, the mura data compensation table to be called at the time of the present turn-on is determined according to said T, the mura data compensation tables corresponding to pre-set different time periods, said ΔT', and said mura data compensation table $a_m$, which can be implemented in many ways, and one specific way of implementation can be: determining if a difference between m and ΔT'/ΔT is greater than zero; if yes, determining that the mura data compensation table initially called at the time of the present turn-on is $a_n$ according to the equation n=[m−ΔT'/ΔT]; otherwise, determining that the mura data compensation table to be called at the time of the present turn-on is the mura data compensation table corresponding to the first time period in said T.

In this embodiment, ΔT'/ΔT can reflect how many time periods elapse during the timing. If the difference between m and ΔT'/ΔT is smaller than or equal to zero, then the mura has restored to its initial state, so it can be directly determined that the mura data compensation table corresponding to the first time period within T should be called.

In the embodiment, the mura data compensation tables corresponding to different time periods can be pre-configured in such a way as: starting from the start-up time, erasing mura using a mura erasing device to obtain a mura data compensation table $a_0$, then erasing the mura once every ΔT until the mura is stable, thereby obtaining and storing mura data compensation tables $a_1$~$a_N$.

In the embodiment, when pre-configuring the mura data compensation tables corresponding to different time periods, the configuration should be started when the mura is in the initial state.

Figure 2:
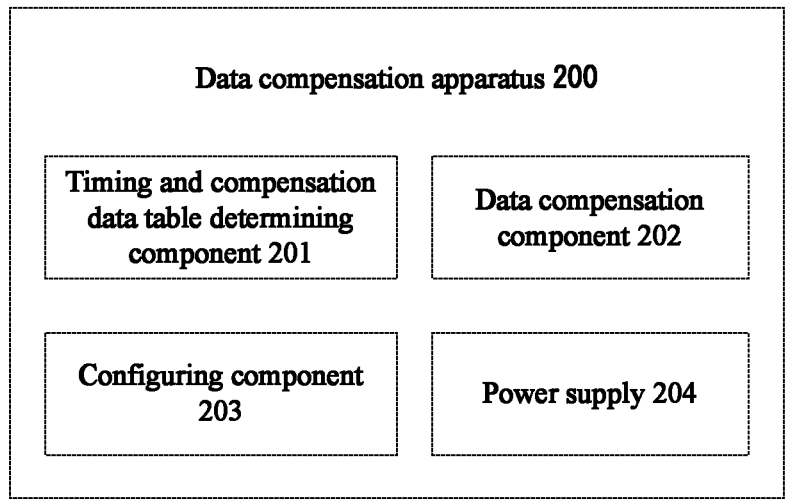
FIG. 2 is a schematic drawing of a data compensation apparatus according to an embodiment of the present disclosure.

Based on the same concept, an embodiment of the present disclosure further provides a data compensation apparatus 200 for a liquid crystal display screen, which, as shown in FIG. 2, comprises:

a timing and compensation data table determining component 201 configured to determine a timing length ΔT' from the last turn-off upon turn-on of the liquid crystal display screen; determine a mura data compensation table $a_m$ called at the time of the last turn-off of the liquid crystal display screen; determine a mura data compensation table to be called at the time of the present turn-on according to a pre-set time length T needed for stabilization of mura, mura data compensation tables corresponding to pre-set different time periods, said determined ΔT', and said mura data compensation table $a_m$;

a data compensation component 202 configured to perform data compensation starting from the determined mura data compensation table to be called at the time of the present turn-on.

In the embodiment of the present disclosure, owing to the different temperatures, the mura is exhibited in different degrees in different time periods. In the present solution, different mura data compensation tables are configured for different time periods, and after turn-on of the liquid crystal display screen, an appropriate initial data compensation data is determined according to the time needed for stabilization of the mura, the timing from the last turn-off of the liquid crystal display screen, and the data compensation table called at the time of turn-off, so the compensation effect is better.

In the embodiment, when determining the timing length ΔT' from the last turn-off, said timing and compensation data table determining component is specifically configured to:

determine a time from the last turn-off to the present turn-on as the timing length ΔT' from the last turn-off.

In the embodiment, when determining the timing length ΔT' from the last turn-off, said timing and compensation data table determining component is specifically configured to:

stop the timing in response to the timing length ΔT' reaching the time length T needed for stabilization of mura.

In the embodiment, when determining the mura data compensation table to be called at the time of the present turn-on, said timing and compensation data table determining component is specifically configured to determine whether ΔT' is smaller than T;

determine the mura data compensation table to be called at the time of the present turn-on according to said T, the mura data compensation tables corresponding to pre-set different time periods, said ΔT', and said mura data compensation table $a_m$ if ΔT' is smaller than T; wherein the pre-set different time periods correspond to different mura data compensation tables, and said T includes N time periods with a length ΔT, and wherein the $(n+1)^{th}$ time period [n*ΔT, (n+1)*ΔT] corresponds to the mura data compensation table $a_n$, n is an integer within the range of [0, N−1]; and time periods after said T correspond to mura data compensation table $a_N$;

determine a mura data compensation table to be called at the time of the present turn-on to be the mura data compensation table corresponding to the first time period in said T if ΔT' is greater than or equal to T.

In the embodiment, if ΔT' is smaller than T, when determining the mura data compensation table to be called at the time of the present turn-on according to said T, the mura data compensation tables corresponding to pre-set different time periods, said ΔT', and said mura data compensation table $a_m$, said timing and compensation data table determining component is specifically configured to:

determine if a difference between m and ΔT'/ΔT is greater than zero; if yes, determine that the mura data compensation table initially called at the time of the present turn-on is $a_n$ according to the equation n=[m−ΔT'/ΔT]; otherwise, determine that the mura data compensation table to be called at the time of the present turn-on is the mura data compensation table corresponding to the first time period in said T.

Optionally, said data compensation apparatus further comprises a configuring component 203 which is configured to pre-configure the mura data compensation tables corresponding to different time periods in such a way as:

starting from the start-up time of the liquid crystal display screen, erasing mura using a mura erasing device to obtain a mura data compensation table $a_0$, then erasing the mura once every ΔT until the mura is stable, thereby obtaining and storing mura data compensation tables $a_1$—$a_N$.

The data compensation method and apparatus for a liquid crystal display screen provided in embodiments of the present disclosure will be described in further detail below in conjunction with a specific scenario of application.

In this embodiment, the data compensation apparatus for a liquid crystal display screen comprises a timing and data compensation table determining component, a data compensation component and a configuring component. The data compensation apparatus for a liquid crystal display screen may further comprise a power supply 204 for supplying power needed for working of respective components in the data compensation apparatus. The liquid crystal display screen comprises a liquid crystal display component for displaying after data compensation.

In the embodiment, the configuring component pre-configures the time length T (which is assumed to be 15 minutes) needed for stabilization of mura after the turn-on of the liquid crystal display screen. Then, when the mura is in the initial state, the mura data compensation tables corresponding to different time periods are pre-configure in such a way as: starting from the start-up time of the liquid crystal display screen, erasing mura using a mura erasing device to obtain a mura data compensation table $a_0$, then erasing the mura once every $\Delta T=5$ min until the mura is stable, thereby obtaining and storing mura data compensation tables $a_1 \sim a_3$. The data compensation tables $a_0 \sim a_3$ are stored in the data compensation component.

In the embodiment, the hardware structure of the timing and data compensation table determining component may be in the form of a Microcontroller Unit (MCU) and an internal clock of a system. A logic drive voltage of the liquid crystal display component, e.g. 3.3V, may be input into a detection pin of the MCU. When the system is power down, i.e. when the system is turned off, the MCU controls the internal clock of the system to start timing. The hardware structure of the internal clock of the system may be a Timing Controller (TCON). After the MCU determines the mura data compensation table, it controls two pins to output the value of n as 2-bit data ("00", "01", "10" or "11"), and the TCON needs to use two General Purpose Input Outputs (GPIOs) to connect to said two pins so as to receive the 2-bit data. If the mura compensation tables increase, the GPIOs also increase correspondingly.

Upon the turn-off of the liquid crystal display screen, the timing and data compensation table determining component records the mura data compensation table $a_m$ that is currently being called. For example, a2 is currently being called and timing is started until another turn-on of the liquid crystal display screen. Optionally, in response to the timing length $\Delta T'$ reaching a preset threshold T, timing is stopped. Thus the timing length $\Delta T'$ is obtained.

Based on the above, in this embodiment, the process of data compensation for the liquid crystal display screen is as follows:

after the turn-on of the liquid crystal display screen, the timing and data compensation table determining component determines a timing length $\Delta T'$ from the last turn-off as well as a mura data compensation table $a_2$ that is being called at the time of the last turn-off; it is determined whether $\Delta T'$ is smaller than T; if $\Delta T'$ is smaller than T, it is determined whether a value of $2-\Delta T'/\Delta T$ is greater than 0; if yes, n is obtained by rounding according to the equation $n=[2-\Delta T'/\Delta T]$, and it is determined that the mura data compensation table $a_n$ is called at the time of the present turn-on; if the value of $2-\Delta T'/\Delta T$ is smaller than or equal to 0, it is determined that the mura data compensation table $a_o$ is called at the time of the present turn-on. If $\Delta T'=T$, it is determined that the mura data compensation table $a_0$ is called at the time of the present turn-on.

The timing and data compensation table determining component outputs the value n of the mura data compensation table $a_n$ that is called at the time of the present turn-on from the MCU-associated pin. The TCON GPIO port calls the mura data compensation table according to the received "00", "01", "10", "11".

If the mura data compensation table $a_2$ is being called at the time of the last turn-off, when $\Delta T'<\Delta T$, the mura data compensation table $a_2$ is called first upon turning on the liquid crystal display screen, then $a_2$ and $a_3$ are called sequentially; when $\Delta T \le \Delta T' < 2\Delta T$, the mura data compensation table $a_1$ is called first upon turning on the liquid crystal display screen, then $a_1$, $a_2$ and $a_3$ are called sequentially; when $2\Delta T \le \Delta T' \le T$, the mura data compensation table $a_0$ is called first upon turning on, then $a_0$, $a_1$, $a_2$ and $a_3$ are called sequentially.

Those skilled in the art shall understand that the embodiments of the present disclosure can be provided as methods, systems or computer program products. Thus the embodiments of the present disclosure can be implemented by hardware, software or a combination thereof. Besides, the present disclosure can be implemented as a computer program product which comprises computer-executable instructions stored on a computer-readable storage medium (including but not limited to a magnetic disc storage, a CD-ROM, an optical storage, etc.), and said computer-executable instructions can enable execution of the above-described data compensation method when being executed.

Embodiments of the present disclosure are described with reference to flow charts and/or block diagrams of the method, device (system) and computer program product according to the embodiments of the present disclosure. It shall be understood that each flow and/or block in the flow charts and/or block diagrams as well as combination of flows and/or blocks in the flow charts and/or block diagrams can be realized by the computer program instructions. Said computer program instructions can be provided to the processor of a general purpose computer, a dedicated computer, an embedded processing machine or other programmable data processing devices to create a machine, so that instructions executed by the processor of the computer or other programmable data processing devices can create devices for realizing functions specified by one or more flows of the flow charts and/or one or more blocks of the block diagrams.

Said computer program instructions can also be stored in a computer-readable memory that can guide the computer or other programmable data processing devices to work in a specific manner, so that instructions stored in said computer-readable memory create products including instruction means that realize functions specified by one or more flows of the flow charts and/or one or more blocks of the block diagrams.

Said computer program instructions can also be loaded on a computer or other programmable data processing devices, so that a series of operation steps are carried out on said computer or other programmable devices to produce computer-implemented processing, such that instructions executed on the computer or other programmable devices provide steps for realizing functions specified by one or more flows of the flow charts and/or one or more blocks of the block diagrams.

Although optional embodiments of the present disclosure have been described, those skilled in the art can make further changes and modifications to said embodiments if they have learned the basic inventive concept. Therefore, the appended claims intend to include the described embodiments and all changes and modifications that fall within the scope of the present disclosure.

Apparently, those skilled in the art can make various changes and modifications to the present disclosure without departing from the spirit and scope of the present disclosure. Therefore, if such changes and modifications to the present disclosure fall into the scope of the claims of the present disclosure and their equivalents, they shall be included in the present disclosure.

The invention claimed is:

1. A data compensation method for a liquid crystal display screen, comprising:
   determining a timing length from a last turn-off of the liquid crystal display screen upon a turn-on of the liquid crystal display screen, and determining a previous mura data compensation table called at a time of the last turn-off;
   determining a mura data compensation table to be called at a time of the present turn-on according to a pre-set time length needed for stabilization of mura, mura data compensation tables corresponding to pre-set different time periods, said determined timing length, and said previous data compensation table;
   performing data compensation starting from the determined mura data compensation table to be called at the time of the present turn-on.

2. The method according to claim 1, wherein said determining a timing length from the last turn-off comprises:
   determining a time from the last turn-off to the present turn-on as the timing length from the last turn-off.

3. The method according to claim 1, wherein said determining a timing length from the last turn-off comprises;
   in response to the timing length reaching the pre-set time length needed for stabilization of mura, timing is stopped.

4. The method according to claim 1, wherein said determining a mura data compensation table to be called at the time of the present turn-on comprises:
   determining whether the timing length is smaller than the time length needed for stabilization of mura;
   if the timing length is smaller than the time length needed for stabilization of mura, determining a mura data compensation table to be called at the time of the present turn-on according to the time length needed for stabilization of mura, the mura data compensation tables corresponding to pre-set different time periods, the timing length, and the previous mura data compensation table wherein the pre-set different time periods correspond to different mura data compensation tables, and said time length includes N time periods with a same period length, and wherein the $(n+1)^{th}$ time period [n*the period length, (n+1)*the period length] corresponds to a $n^{th}$ mura data compensation table, n is an integer within the range of [0, N−1] and N is an integer; and time periods after said time length correspond to a $N^{th}$ mura data compensation table;
   if the timing length is greater than or equal to the time length needed for stabilization of mura, determining a mura data compensation table to be called at the time of the present turn-on to be the mura data compensation table corresponding to the first time period in said time length.

5. The method according to claim 4, wherein said if the timing length is smaller than the time length needed for stabilization of mura, determining a mura data compensation table to be called at the time of the present turn-on according to said time length needed for stabilization of mura, the mura data compensation tables corresponding to pre-set different time periods, said timing length, and said previous mura data compensation table comprises:
   determining if a difference between an index of the time period corresponding to the previous mura data compensation table and a value of the timing length divided by the time length is greater than zero; if yes, determining that the mura data compensation table called at the time of the present turn-on is an $n^{th}$ mura data compensation table according to the equation n=[the difference]; otherwise, determining that the mura data compensation table to be called at the time of the present turn-on is the mura data compensation table corresponding to the first time period in said time length.

6. The method according to claim 4, wherein the mura data compensation tables corresponding to different time periods are pre-set by the following steps:
   starting from the start-up time, erasing mura using a mura erasing device to obtain an initial mura data compensation table then erasing the mura once every the time length until the mura is stable, thereby obtaining and storing mura data compensation tables corresponding to all the time periods.

7. A data compensation apparatus for a liquid crystal display screen, comprising:
   a timing and compensation data table determining component configured to determine a timing length from a last turn-off of the liquid crystal display screen upon a turn-on of the liquid crystal display screen; determine a previous mura data compensation table called at a time of the last turn-off; determine a mura data compensation table to be called at a time of the present turn-on according to a pre-set time length needed for stabilization of mura, mura data compensation tables corresponding to pre-set different time periods, said determined timing length, and said previous mura data compensation table;
   a data compensation component configured to perform data compensation starting from the determined mura data compensation table to be called at the time of the present turn-on.

8. The data compensation apparatus according to claim 7, wherein said timing and compensation data table determining component is configured to determine a time from the last turn-off to the present turn-on as the timing length from the last turn-off in response to determining the timing length from the last turn-off.

9. The data compensation apparatus according to claim 7, wherein said timing and compensation data table determining component is further configured to:
   stop the timing in response to the timing length reaching the time length needed for stabilization of mura.

10. The data compensation apparatus according to claim 7, wherein said timing and compensation data table determining component is configured, in response to determining the mura data compensation table to be called at the time of the present turn-on, to:
    determine whether the timing length is smaller than the time length needed for stabilization of mura;
    determine a mura data compensation table to be called at the time of the present turn-on according to the time length needed for stabilization of mura, the mura data compensation tables corresponding to pre-set different time periods, the timing length, and the previous mura data compensation table if the timing length is smaller than the time length needed for stabilization of mura; wherein the pre-set different time periods correspond to different mura data compensation tables, and said time length includes N time periods with a period; length, wherein the $(n+1)^{th}$ time period [n*the time length, (n+1)*the time length] corresponds to a $n^{th}$ mura data compensation table n is an integer within the range of [0, N−1] and N is an integer; and time periods after said time length correspond to a $N^{th}$ mura data compensation table;

determine a mura data compensation table to be called at the time of the present turn-on to be the mura data compensation table corresponding to the first time period in said time length, if the timing length is greater than or equal to the time length needed for stabilization of mura.

11. The data compensation apparatus according to claim 10, wherein under the condition of determining the mura data compensation table to be called at the time of the present turn-on according to said time length needed for stabilization of mura, the mura data compensation tables corresponding to pre-set different time periods, said timing length, and said previous mura data compensation table if the timing length is smaller than the time length needed for stabilization of mura, said timing and compensation data table determining component is configured to:

determine if a difference between an index of the time period corresponding to the previous mura data compensation table and a value of the timing length divided by the time length is greater than zero; if yes, determine that the mura data compensation table initially called at the time of the present turn-on is an $n^{th}$ mura data compensation table according to the equation n=[the difference]; otherwise, determine that the mura data compensation table to be called at the time of the present turn-on is the mura data compensation table corresponding to the first time period in said time length.

12. The data compensation apparatus according to claim 9, further comprising a configuring component which is configured to pre-configure the mura data compensation tables corresponding to different time periods in such a way as: starting from the start-up time, erasing mura using a mura erasing device to obtain an initial mura data compensation table; then erasing the mura once every the period length until the mura is stable, thereby obtaining and storing mura data compensation tables corresponding to all the time periods.

* * * * *